(12) United States Patent
Sun et al.

(10) Patent No.: US 10,389,857 B2
(45) Date of Patent: Aug. 20, 2019

(54) MOBILE COMMUNICATIONS TERMINAL

(71) Applicant: Huawei Technologies Co., Ltd., Shenzhen (CN)

(72) Inventors: Qiao Sun, Xi'an (CN); Yi Wang, Xi'an (CN); Hanyang Wang, Reading (GB); Yibo Chen, Shenzhen (CN); Bao Lu, Shenzhen (CN); Shiqiang Lu, Xi'an (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/063,519

(22) PCT Filed: Dec. 17, 2015

(86) PCT No.: PCT/CN2015/097707
§ 371 (c)(1),
(2) Date: Jun. 18, 2018

(87) PCT Pub. No.: WO2017/101068
PCT Pub. Date: Jun. 22, 2017

(65) Prior Publication Data
US 2018/0375971 A1    Dec. 27, 2018

(51) Int. Cl.
*H04M 1/02*    (2006.01)
*H01Q 1/24*    (2006.01)
(Continued)

(52) U.S. Cl.
CPC .......... *H04M 1/0202* (2013.01); *H01Q 1/243* (2013.01); *H01Q 1/38* (2013.01); *H01Q 9/42* (2013.01); *H04M 1/02* (2013.01)

(58) Field of Classification Search
CPC .............................................. H01Q 1/22; H01Q 1/38; H01Q 1/243; H01Q 1/42; H01Q 1/50; H01Q 13/10;
(Continued)

(56) References Cited

U.S. PATENT DOCUMENTS 8,963,785 B2   2/2015  Dong et al.
9,431,717 B1*  8/2016  Lee .......... H01Q 1/243
(Continued)

FOREIGN PATENT DOCUMENTS

CN    102227036 A    10/2011
CN    102780089 A    11/2012
(Continued)

OTHER PUBLICATIONS

Machine Translation and Abstract of Chinese Publication No. CN102227036, Oct. 26, 2011, 9 pages.
(Continued)

*Primary Examiner* — George Eng
*Assistant Examiner* — Hung K Du
(74) *Attorney, Agent, or Firm* — Conley Rose, P.C.

(57) ABSTRACT

A mobile communications terminal includes a metal backplane, a circuit board, and a metal frame. A feeding structure is located between a first ground point and a second ground point. A slot is located between the first ground point and the feeding structure. The first antenna uses, as a radiator, a part of the metal frame between the slot and the first ground point. The second antenna uses, as a radiation slot, a gap between the metal backplane and the part of the metal frame between the slot and the first ground point. The third antenna uses, as another radiation slot, a gap between the metal backplane and a part of the metal frame between the slot and the second ground point.

12 Claims, 16 Drawing Sheets

(51) Int. Cl.
*H01Q 1/38* (2006.01)
*H01Q 1/42* (2006.01)
*H01Q 9/42* (2006.01)

(58) Field of Classification Search
CPC ........ H01Q 13/106; H01Q 5/30; H01Q 5/328;
H01Q 5/357; H01Q 5/371; H01Q 5/378;
H01Q 7/00; H01Q 21/28; H01Q 9/42;
H04M 1/02
See application file for complete search history.

(56) References Cited

U.S. PATENT DOCUMENTS

| | | | | |
|---|---|---|---|---|
| 9,484,631 | B1* | 11/2016 | Napoles | H01Q 1/243 |
| 2014/0184449 | A1 | 7/2014 | Dong et al. | |
| 2014/0218250 | A1* | 8/2014 | Kim | H01Q 13/106 |
| | | | | 343/767 |
| 2015/0092623 | A1* | 4/2015 | Svendsen | H01Q 13/103 |
| | | | | 370/278 |
| 2015/0147984 | A1* | 5/2015 | Ying | H04B 1/3827 |
| | | | | 455/90.3 |
| 2016/0064820 | A1* | 3/2016 | Kim | H01Q 1/243 |
| | | | | 343/767 |
| 2016/0164168 | A1* | 6/2016 | Choi | H01Q 1/48 |
| | | | | 343/702 |
| 2017/0033437 | A1 | 2/2017 | Ghit et al. | |

FOREIGN PATENT DOCUMENTS

| | | |
|---|---|---|
| CN | 103178344 A | 6/2013 |
| CN | 103700934 A | 4/2014 |
| CN | 204651481 U | 9/2015 |
| CN | 105098352 A | 11/2015 |

OTHER PUBLICATIONS

Machine Translation and Abstract of Chinese Publication No. CN103178344, Jun. 26, 2013, 12 pages.
Machine Translation and Abstract of Chinese Publication No. CN204651481, Sep. 16, 2015, 8 pages.
Foreign Communication From a Counterpart Application, PCT Application No. PCT/CN2015/097707, English Translation of International Search Report dated Sep. 9, 2016, 2 pages.
Foreign Communication From a Counterpart Application, PCT Application No. PCT/CN2015/097707, English Translation of Written Opinion dated Sep. 9, 2016, 6 pages.
Machine Translation and Abstract of Chinese Publication No. CN102780089, Nov. 14, 2012, 15 pages.
Machine Translation and Abstract of Chinese Publication No. CN103700934, Apr. 2, 2014, 17 pages.

* cited by examiner

MOBILE COMMUNICATIONS TERMINAL

CROSS-REFERENCE TO RELATED APPLICATION

This application is a U.S. National Stage of International Patent Application No. PCT/CN2015/097707 filed on Dec. 17, 2015, which is hereby incorporated by reference in its entirety.

TECHNICAL FIELD

The present disclosure relates to the field of communications technologies, and in particular, to a mobile communications terminal.

BACKGROUND

Currently, in design of a mobile communications terminal, use of a metal housing is becoming a trend. In addition, people have a higher requirement for an information service of the mobile communications terminal, and therefore there is a higher requirement for performance of an antenna in the mobile communications terminal.

In a mobile communications terminal with a metal housing, because of an electromagnetic shielding effect of the metal housing, the metal housing greatly affects operating performance of an antenna system disposed in the housing of the mobile communications terminal. Therefore, an architecture of the metal housing poses a huge challenge to disposing of an antenna system in the mobile communications terminal.

A metal housing used in the mobile communications terminal includes a metal frame. Currently, in the mobile communications terminal with a metal housing, a main solution of designing an antenna is to use the metal frame as a radiator of the antenna. The metal frame is divided into several parts by slotting the metal frame on different positions, and the several parts into which the metal frame is divided are separately used as radiators of antennas such as a primary antenna and a diversity antenna.

However, a slot disposed in the metal frame affects an aesthetic appearance of the mobile communications terminal. Therefore, a quantity of slots in the metal frame is limited, and a quantity of formed radiators is also limited. However, currently, a wider frequency range needs to be covered by the antenna system in the mobile communications terminal, and a larger quantity of antennas are required in the antenna system in the mobile communications terminal. Therefore, how to provide a mobile communications terminal that can implement multiple resonances and cover multiple frequency bands using a relatively small quantity of radiators has become a research focus of persons skilled in the art.

SUMMARY

The present disclosure provides a mobile communications terminal, and the mobile communications terminal can implement multiple resonances and cover multiple frequency bands using a relatively small quantity of radiators.

According to a first aspect, a mobile communications terminal is provided, including a metal housing and a circuit board, where the metal housing includes a metal backplane and a metal frame that is disposed around the metal backplane and that is perpendicular to the metal backplane, a gap is formed between the metal frame and the metal backplane in a thickness direction of the metal backplane. The circuit board is disposed in a section surrounded by the metal frame, and is disposed parallel to the metal backplane, a first feeding structure is formed between the circuit board and the metal frame, the metal frame is provided with a first slot, a first ground point, and a second ground point, and in an extension direction of the gap, the first feeding structure is located between the first ground point and the second ground point, and the first slot is located between the first ground point and the first feeding structure in order to form a first antenna, a second antenna, and a third antenna, where the first antenna uses, as a radiator, a part that is of the metal frame and that is between the first slot and the first ground point, and the first antenna includes a first resonance frequency. The second antenna is located between the first slot and the first ground point, the second antenna uses, as a radiation slot, a gap between the metal backplane and the part that is of the metal frame and that is between the first slot and the first ground point, and the second antenna includes a second resonance frequency. The third antenna is located between the first slot and the second ground point, the third antenna uses, as a radiation slot, a gap between the metal backplane and a part that is of the metal frame and that is between the first slot and the second ground point, and the third antenna includes a third resonance frequency, and the first resonance frequency, the second resonance frequency, and the third resonance frequency are different.

With reference to the first aspect, in a second possible implementation, when the first antenna operates at the first resonance frequency, an electric field and currents are evenly distributed in the circuit board and the metal frame, a length of the second antenna is a quarter wavelength corresponding to the second resonance frequency, and a length of the third antenna is a half wavelength corresponding to the third resonance frequency.

With reference to the first aspect, in a fourth possible implementation, the feeding structure includes a first feeding point that is disposed between the first slot and the second ground point.

With reference to any one of the first aspect, or the first possible implementation and the second possible implementation of the first aspect, in a third possible implementation, a second feeding structure and a third ground point are further disposed between the circuit board and the metal frame, and the metal frame is provided with a second slot in order to form a diversity antenna structure.

With reference to the third possible implementation of the first aspect, in a fourth possible implementation, the second feeding structure includes a second feeding point.

With reference to the fourth possible implementation of the first aspect, in a fifth possible implementation, in an extension direction of a gap between the circuit board and the metal frame, the second slot is located on a side that is of the first ground point and that is opposite to the first slot, the second feeding point is located on a side that is of the second slot and that is opposite to the first ground point, and the third ground point is located on a side that is of the second feeding point and that is opposite to the second slot, or the second feeding point is located on a side that is of the second ground point and that is opposite to the first feeding point, the second slot is located on a side that is of the second feeding point and that is opposite to the second ground point, and the third ground point is located on a side that is of the second slot and that is opposite to the second feeding point.

According to the mobile communications terminal provided in the first aspect, in the mobile communications terminal, a metal frame, a metal backplane, a circuit board, a first ground point, a second ground point, a first slot, and a first feeding structure cooperate with each other to form three antennas, a first antenna, a second antenna, and a third antenna. The first antenna uses, as a radiator, a part that is of the metal frame and that is between the first slot and the first ground point. The second antenna is located between the first slot and the first ground point, and the second antenna uses, as a radiation slot, a gap between the metal backplane and the part that is of the metal frame and that is between the first slot and the first ground point. The third antenna is located between the first slot and the second ground point, and the third antenna uses, as a radiation slot, a gap between the metal backplane and a part that is of the metal frame and that is between the first slot and the second ground point. Therefore, the foregoing antenna system can implement multiple resonances and cover three frequency bands when a quantity of radiators is limited. Therefore, the foregoing antenna system can implement multiple resonances and cover three frequency bands when a quantity of radiators is limited.

BRIEF DESCRIPTION OF DRAWINGS

To describe the technical solutions in the embodiments of the present disclosure more clearly, the following briefly describes the accompanying drawings required for describing the embodiments. The accompanying drawings in the following description show merely some embodiments of the present disclosure, and persons of ordinary skill in the art may still derive other drawings from these accompanying drawings without creative efforts.

DESCRIPTION OF EMBODIMENTS

The following clearly describes the technical solutions in the embodiments of the present disclosure with reference to the accompanying drawings in the embodiments of the present disclosure. The described embodiments are merely some but not all of the embodiments of the present disclosure. All other embodiments obtained by persons of ordinary skill in the art based on the embodiments of the present disclosure without creative efforts shall fall within the protection scope of the present disclosure.

Figure 1:
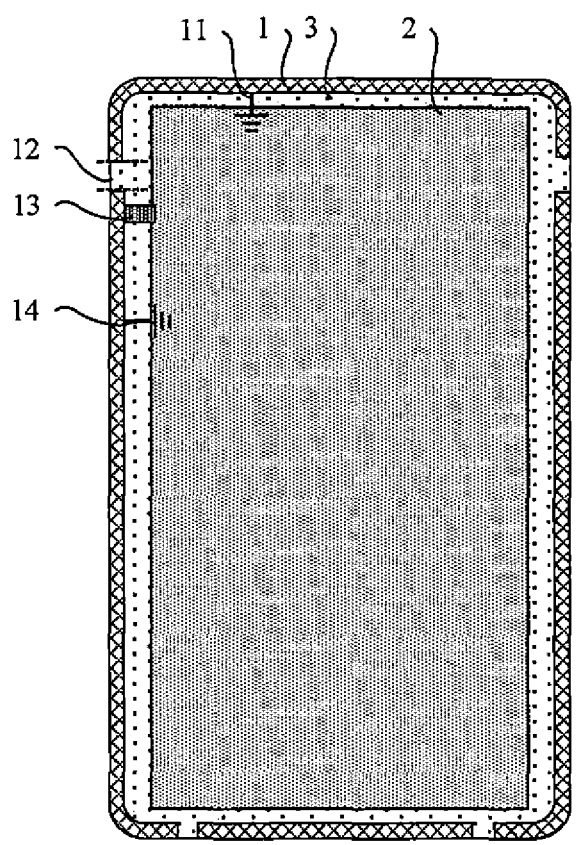
FIG. 1 is a schematic structural diagram of a mobile communications terminal according to an embodiment of the present disclosure.
Figure 2:
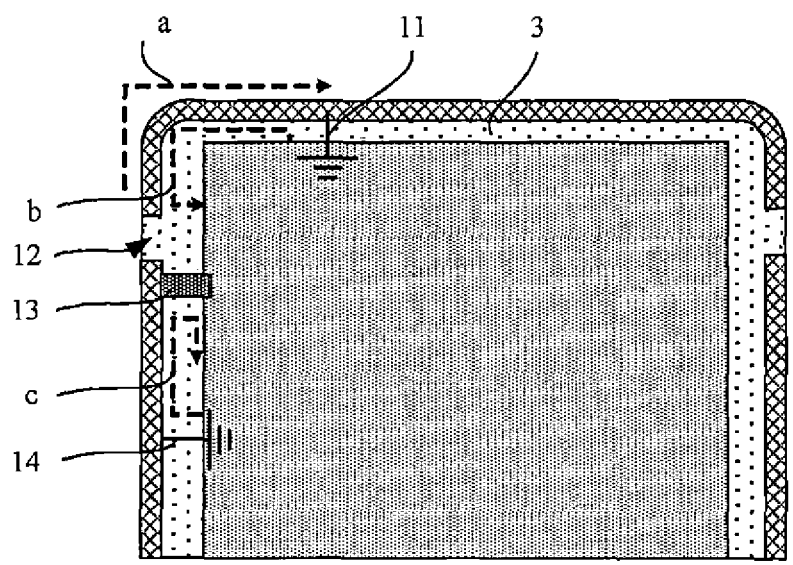
FIG. 2 is a schematic diagram of covering three frequency bands by an antenna system in the mobile communications terminal having the structure shown in FIG. 1.
Figure 3:
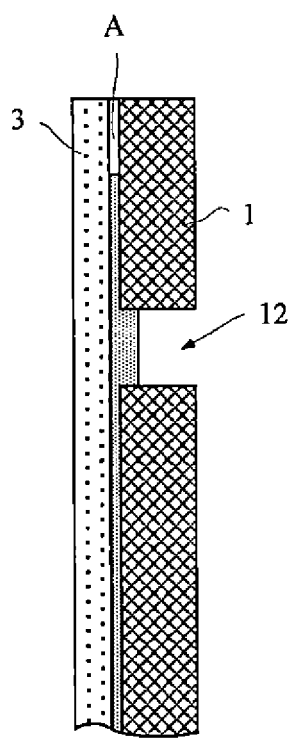
FIG. 3 is a schematic structural diagram of a gap formed between a metal frame and a metal backplane in the mobile communications terminal having the structure shown in FIG. 2.

An embodiment of the present disclosure provides a mobile communications terminal. As shown in FIG. 1, FIG. 2, and FIG. 3, the mobile communications terminal includes a metal housing and a circuit board 2. The metal housing includes a metal backplane 3 and a metal frame 1 that is disposed around the metal backplane 3 and that is perpendicular to the metal backplane 3. As shown in FIG. 3, in a thickness direction of the metal backplane 3, a gap A is formed between the metal frame 1 and the metal backplane 3. Preferably, the metal frame 1 is stuck to the metal backplane 3 using resin glue. The circuit board 2 is disposed in a section surrounded by the metal frame 1, and is disposed parallel to the metal backplane 3. A first feeding structure 13 is formed between the circuit board 2 and the metal frame 1. The metal frame 1 is provided with a first slot 12, a first ground point 11, and a second ground point 14. In an extension direction of the gap A, the first feeding structure 13 is located between the first ground point 11 and the second ground point 14, and the first slot 12 is located between the first ground point 11 and the first feeding structure 13 in order to form a first antenna, a second antenna, and a third antenna.

The first antenna uses, as a radiator, a part that is of the metal frame 1 and that is between the first slot 12 and the first ground point 11, and the first antenna includes a first resonance frequency.

The second antenna is located between the first slot 12 and the first ground point 11, the second antenna uses, as a radiation slot, a gap between the metal backplane 3 and the part that is of the metal frame 1 and that is between the first slot 12 and the first ground point 11, and the second antenna includes a second resonance frequency.

The third antenna is located between the first slot 12 and the second ground point 14, the third antenna uses, as a radiation slot, a gap between the metal backplane 3 and a part that is of the metal frame 1 and that is between the first slot 12 and the second ground point 14, and the third antenna includes a third resonance frequency.

The first resonance frequency, the second resonance frequency, and the third resonance frequency are different.

In the mobile communications terminal, the metal frame 1, the metal backplane 3, the circuit board 2, the first ground point 11, the second ground point 14, the first slot 12, and the first feeding structure 13 cooperate with each other to form an antenna system that covers three frequency bands. The antenna system implements multiple resonances and covers multiple frequency bands when a quantity of radiators is limited. In addition, shielding impact of the metal housing on a signal of the antenna system can be reduced.

In a specific implementation, the metal housing further includes a front metal housing, and the first ground point 11 and the second ground point 14 are connected to the front metal housing.

The mobile communications terminal is usually a rectangular structure. Therefore, in the mobile communications terminal, the first slot 12 may be disposed on multiple selectable positions in the metal frame 1. Examples are given below.

In a preferred implementation, as shown in FIG. 1 and FIG. 2, the first slot 12 is disposed in a part of the metal frame 1 on a side of the mobile communications terminal.

Figure 8:
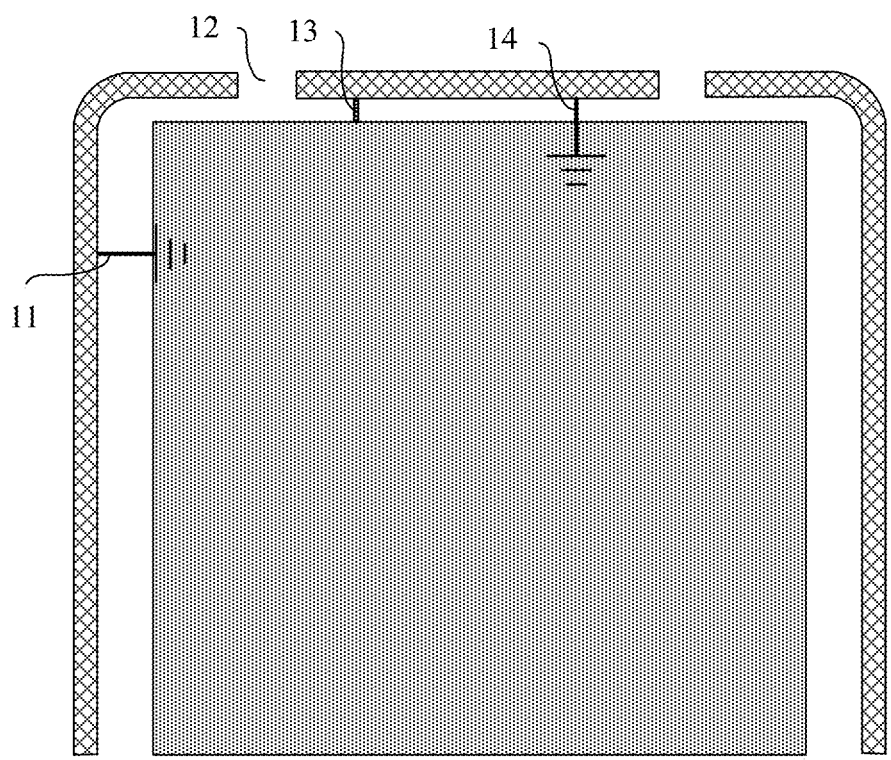
FIG. 8 is a schematic structural diagram of a mobile communications terminal according to another embodiment of the present disclosure.

In another preferred implementation, as shown in FIG. 8, the first slot 12 may be disposed in a part of the metal frame 1 on a top of the mobile communications terminal.

In the foregoing solutions, the first slot 12 is disposed on the side or the top of the mobile communications terminal such that impact on antenna performance may be reduced when a user holds the mobile communications terminal.

A position on which the first slot 12 is disposed may be determined according to an actual requirement such as a shape of a product. Details are not described herein.

When the first antenna operates at the first resonance frequency, an electric field and currents are evenly distributed in the circuit board 2 and the metal frame 1.

A length of the second antenna is a quarter wavelength corresponding to the second resonance frequency.

A length of the third antenna is a half wavelength corresponding to the third resonance frequency.

Figure 4:
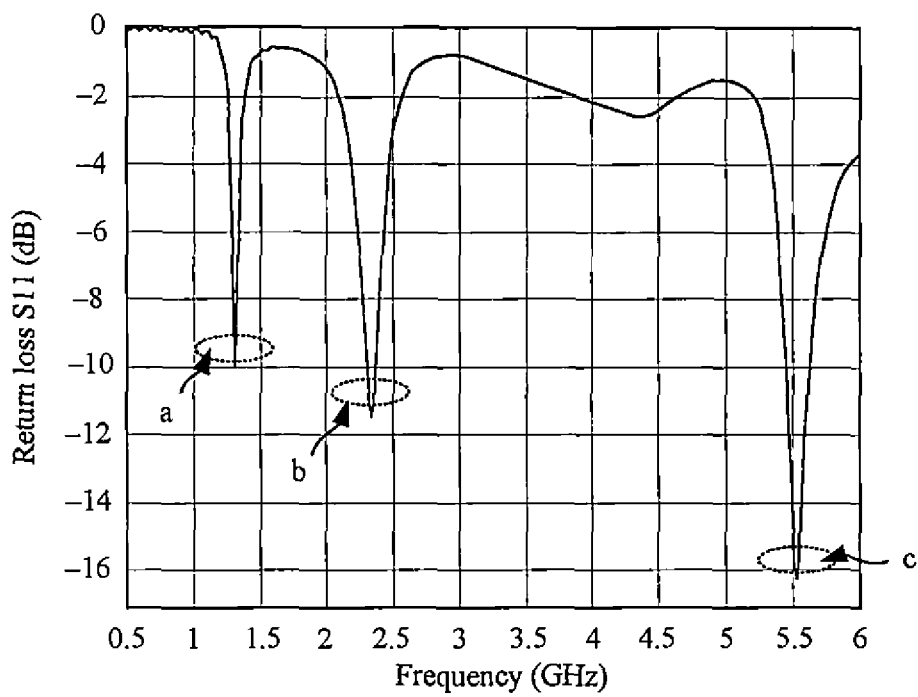
FIG. 4 is a schematic diagram of direct-feeding return losses of the mobile communications terminal having the structure shown in FIG. 1.

In a specific implementation, in the mobile communications terminal, the first antenna may be a left-hand mode global positioning system (GPS) antenna corresponding to the first resonance frequency, the second antenna is a quarter wavelength slot antenna corresponding to the second resonance frequency, and the third antenna is a half wavelength slot antenna corresponding to the third resonance frequency. Further, as shown in FIG. 2, a is a current direction of the first antenna, b is a current direction of the second antenna, and c is a current direction of the third antenna. In addition, direct-feeding return losses of the first antenna, the second antenna, and the third antenna are shown in FIG. 4.

When the antenna system formed in the mobile communications terminal operates, currents, electric fields, and the like of the first antenna, the second antenna, and the third antenna are shown below.

Figure 5A:
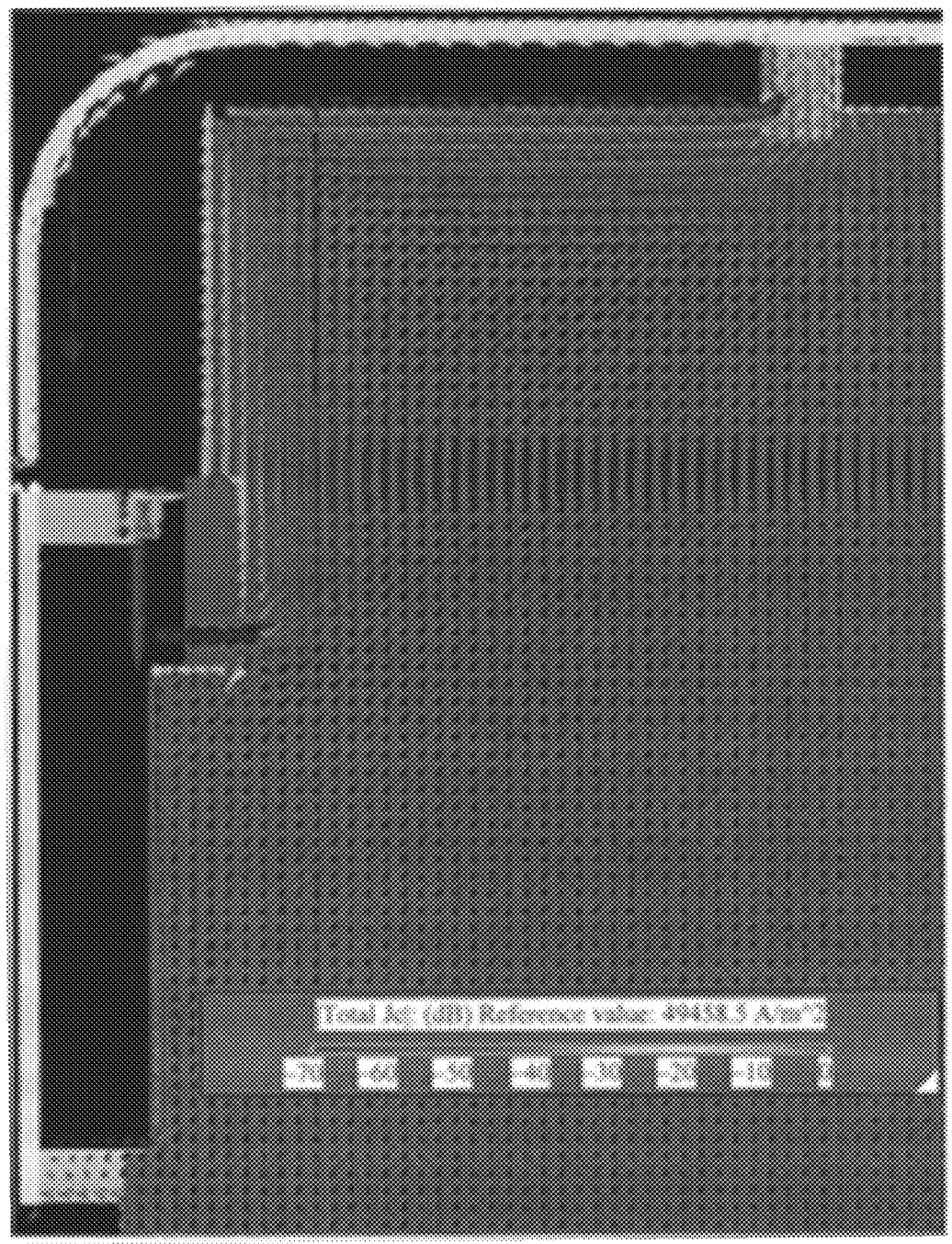
FIG. 5A is a distribution diagram of currents of a first antenna in the mobile communications terminal having the structure shown in FIG. 1.
Figure 5B:
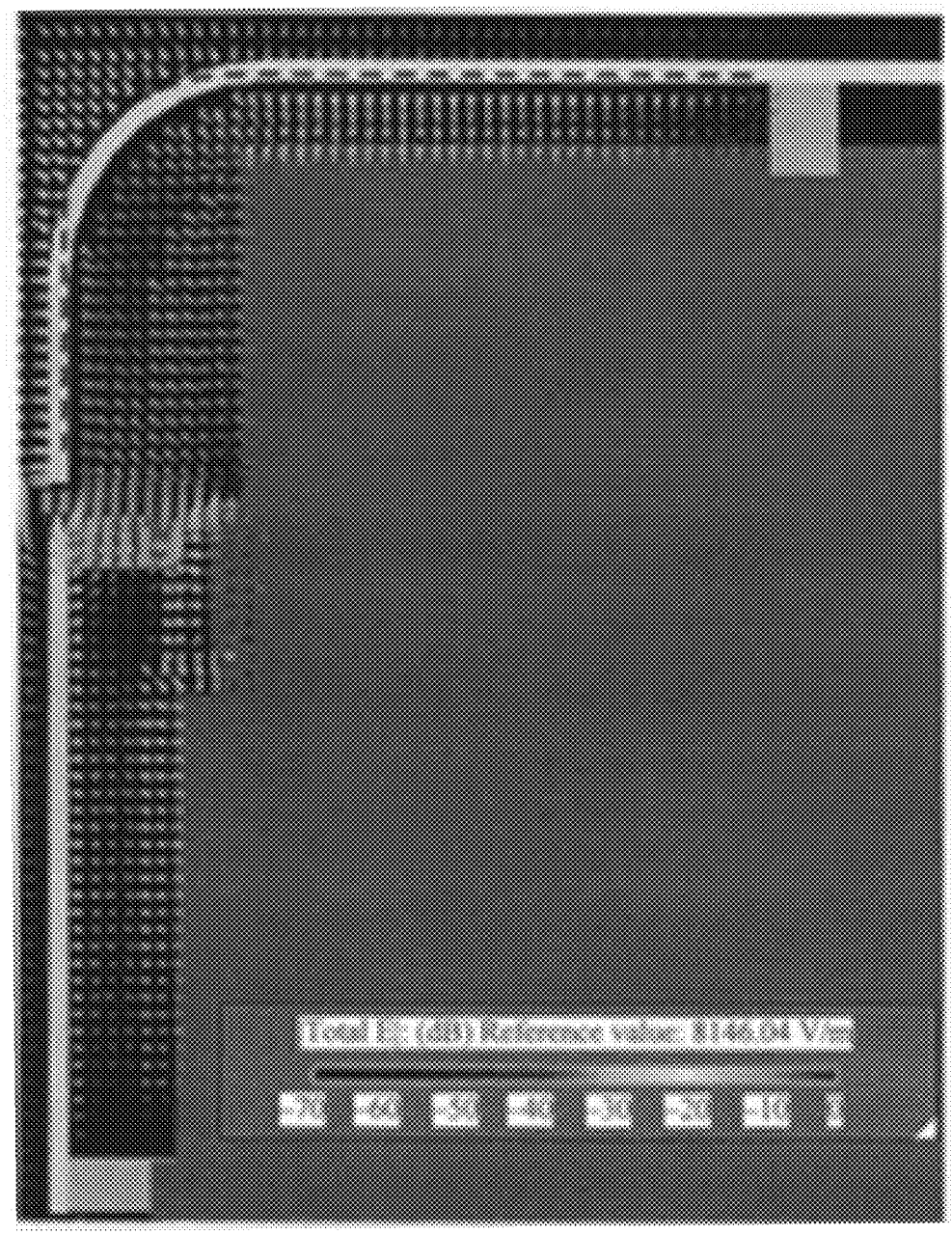
FIG. 5B is a distribution diagram of an electric field of a first antenna in the mobile communications terminal having the structure shown in FIG. 1.
Figure 5C:
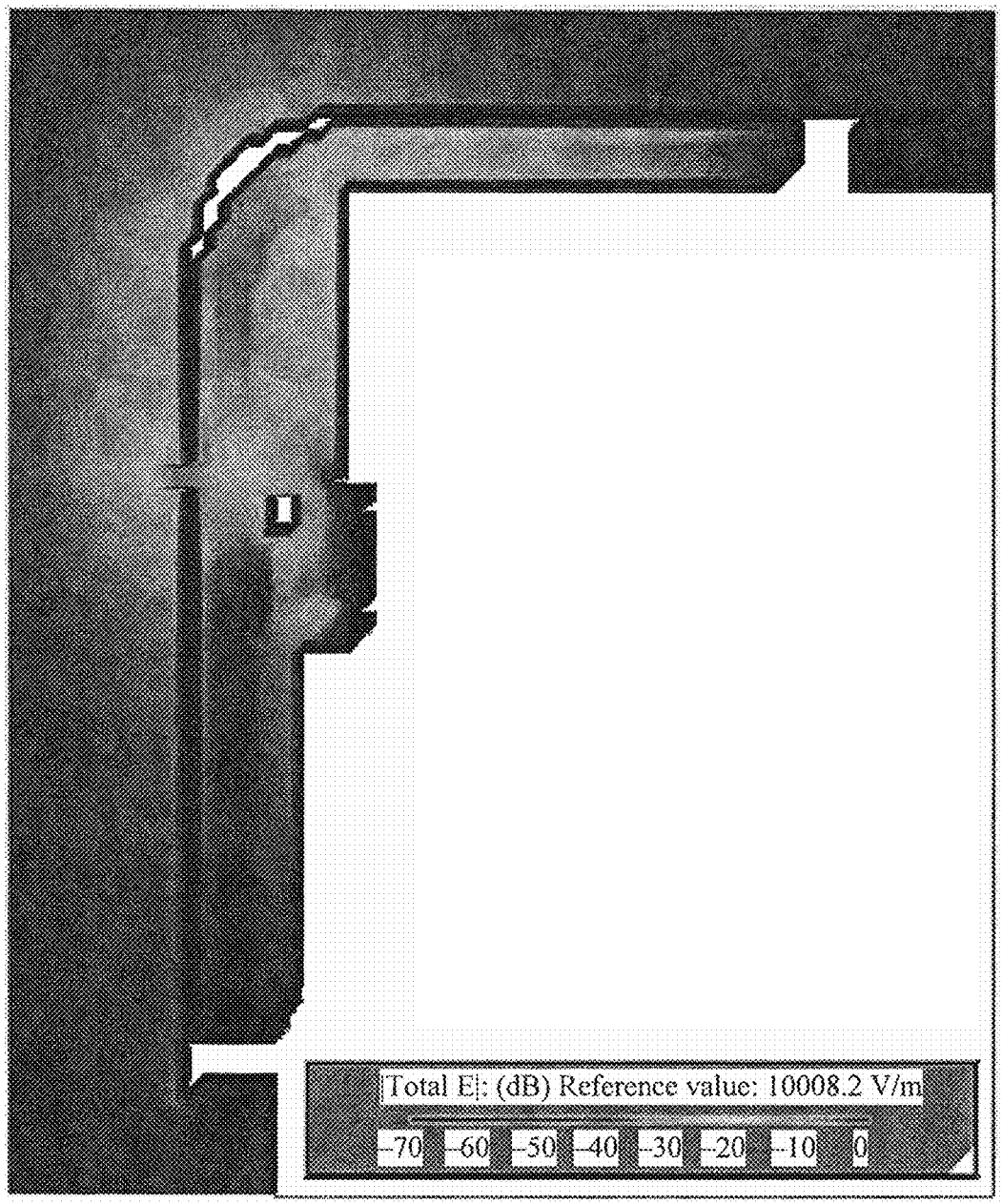
FIG. 5C is a scalar diagram of an electric field of a first antenna in the mobile communications terminal having the structure shown in FIG. 1.

The first antenna is the left-hand mode GPS antenna. The first antenna uses, as a radiator, the part that is of the metal frame 1 and that is between the first slot 12 and the first ground point 11. When the first antenna operates, an electric field and currents are evenly distributed in the circuit board 2 and the metal frame 1. For example, a distribution diagram of the currents of the first antenna is shown in FIG. 5A, a distribution diagram of the electric field is shown in FIG. 5B, and a scalar diagram of the electric field is shown in FIG. 5C.

Figure 6A:
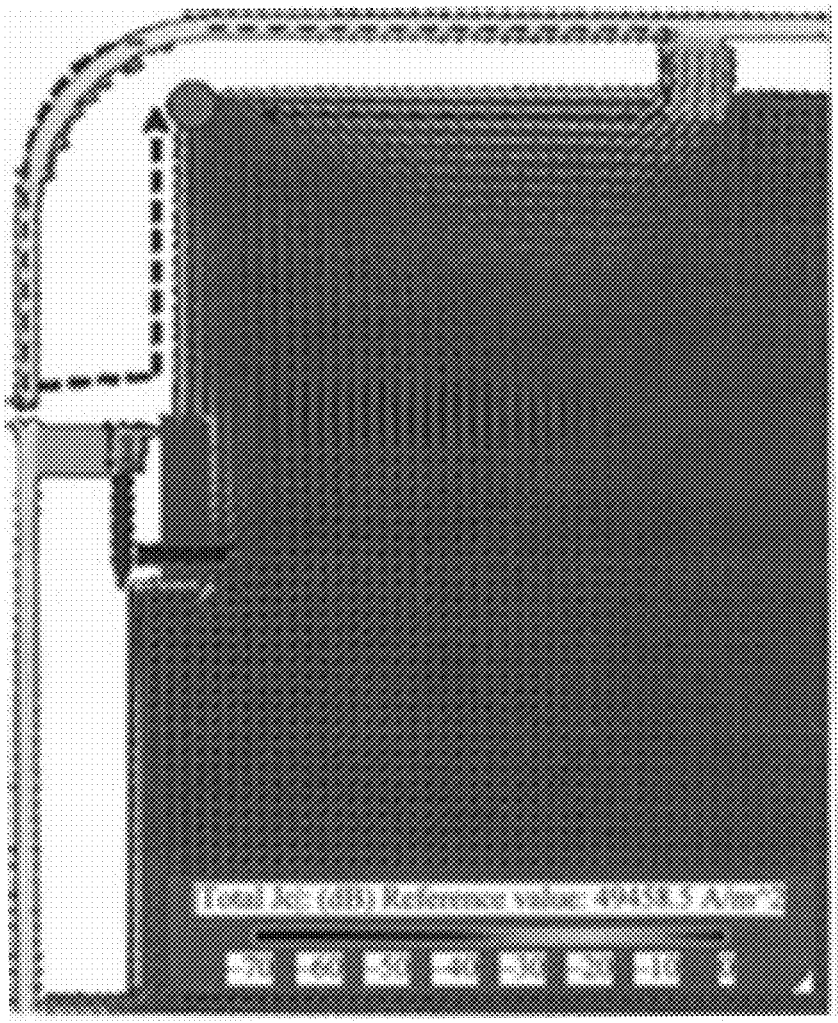
FIG. 6A is a distribution diagram of currents of a second antenna in the mobile communications terminal having the structure shown in FIG. 1.
Figure 6B:
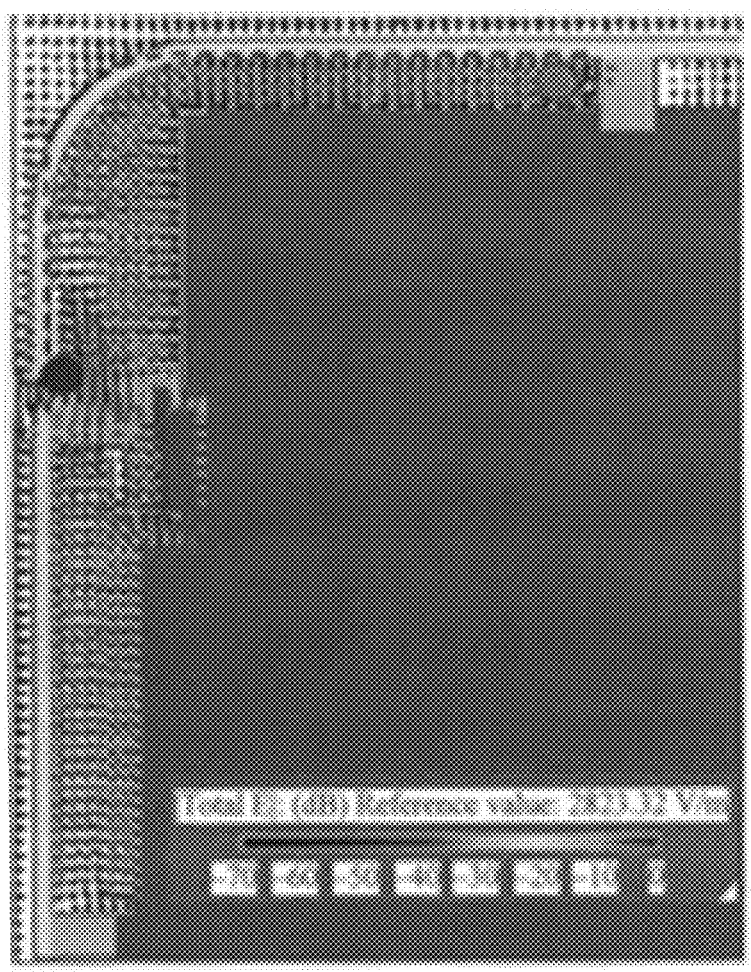
FIG. 6B is a distribution diagram of an electric field of a second antenna in the mobile communications terminal having the structure shown in FIG. 1.
Figure 6C:
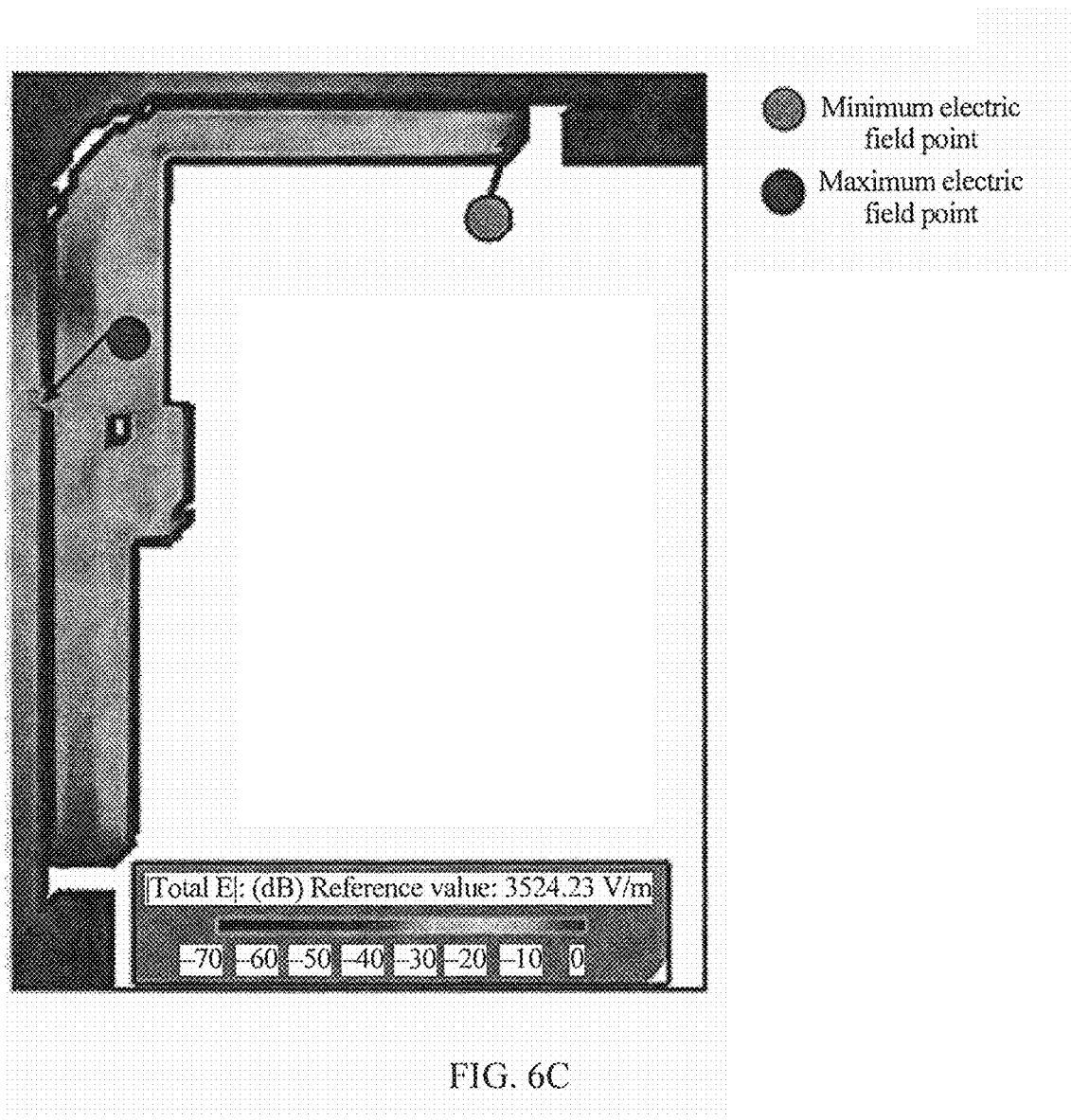
FIG. 6C is a scalar diagram of an electric field of a second antenna in the mobile communications terminal having the structure shown in FIG. 1.

The second antenna is a quarter wavelength slot antenna. The second antenna uses, as a radiation slot, the gap between the metal backplane 3 and the part that is of the metal frame 1 and that is between the first slot 12 and the first ground point 11. In addition, a part used as a radiation slot in the second antenna is open in the first slot 12. Therefore, in a specific operating process of the second antenna, a distribution diagram of currents is shown in FIG. 6A, a distribution diagram of an electric field is shown in FIG. 6B, and a scalar diagram of the electric field is shown in FIG. 6C.

Figure 7A:
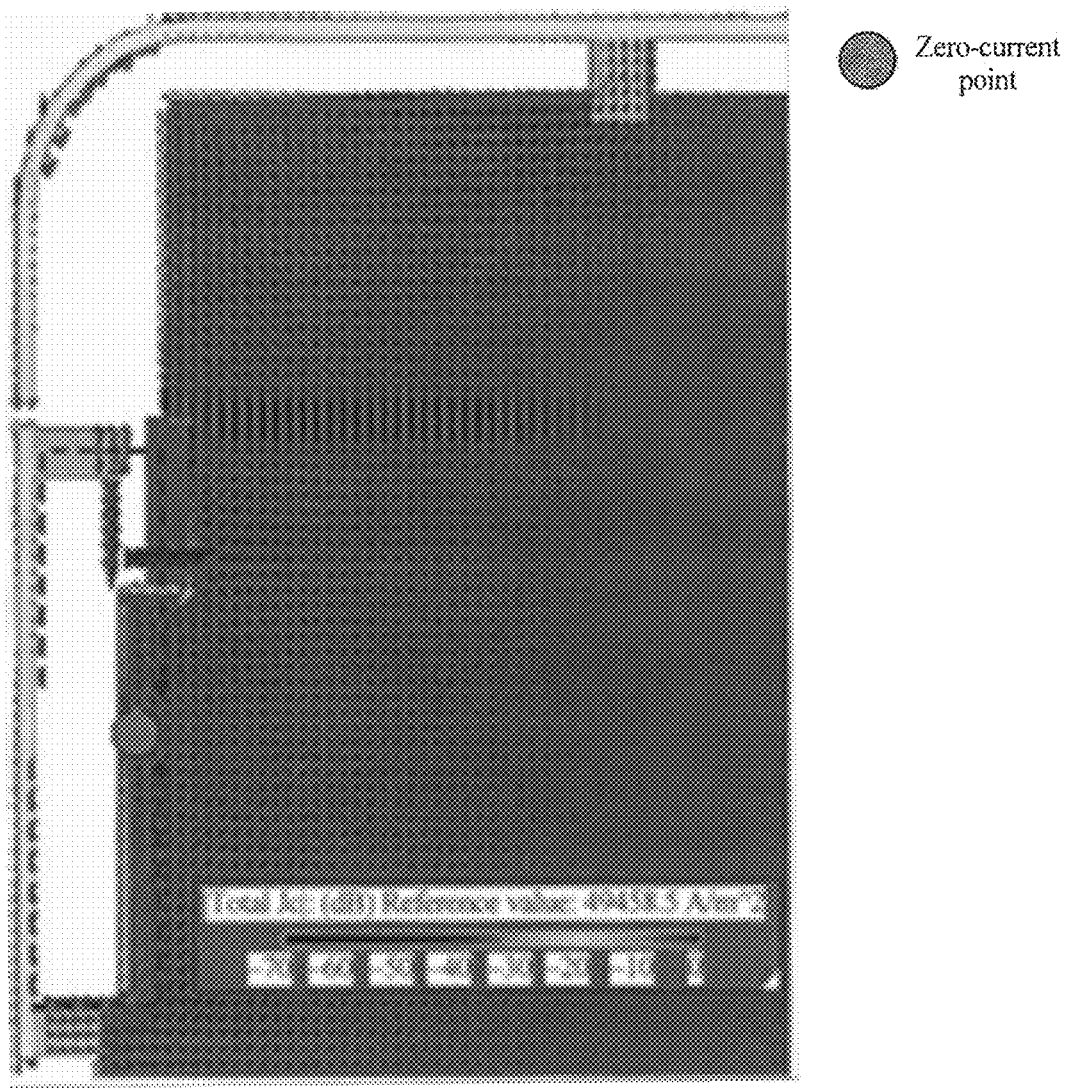
FIG. 7A is a distribution diagram of currents of a third antenna in the mobile communications terminal having the structure shown in FIG. 1.
Figure 7B:
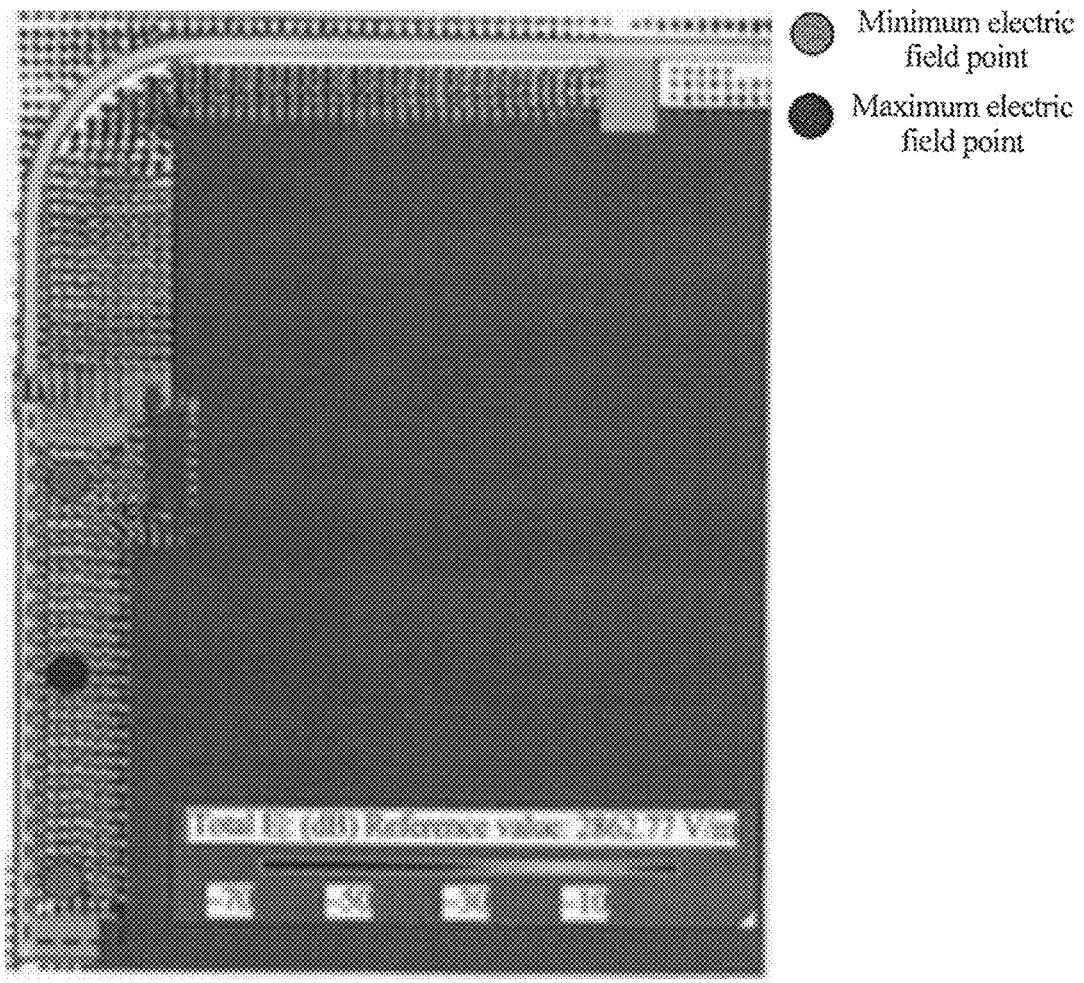
FIG. 7B is a distribution diagram of an electric field of a third antenna in the mobile communications terminal having the structure shown in FIG. 1.
Figure 7C:
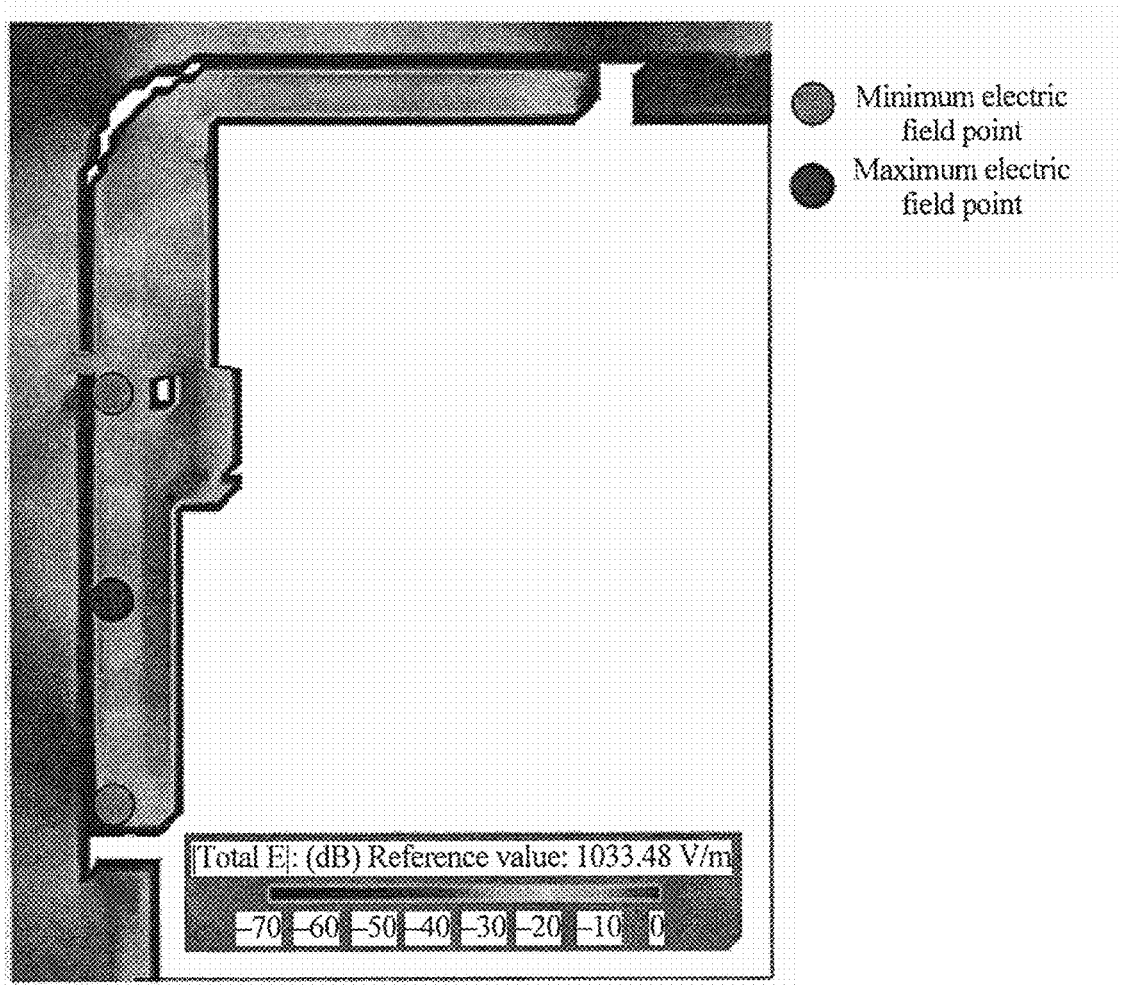
FIG. 7C is a scalar diagram of an electric field of a third antenna in the mobile communications terminal having the structure shown in FIG. 1.

The third antenna is a half wavelength slot antenna. The third antenna uses, as a radiation slot, the gap between the metal backplane 3 and a part that is of the metal frame 1 and that is between the first slot 12 and the second ground point 14. A radiation slot used by the third antenna is a closed slot because of existence of the first feeding structure 13 and the second ground point 14. In a specific operating process of the third antenna, a distribution diagram of currents is shown in FIG. 7A, a distribution diagram of an electric field is shown in FIG. 7B, and a scalar diagram of the electric field is shown in FIG. 7C.

In the mobile communications terminal, the first feeding structure 13 may feed the first antenna, the second antenna, and the third antenna in multiple manners. Examples are given below.

In an optional manner, in the mobile communications terminal, the first feeding structure 13 between the first metal frame 1 and the circuit board 2 includes a first feeding point that is disposed between the first slot 12 and the second ground point 14. When feeding the first antenna, the second antenna, and the third antenna, the first feeding structure 13 directly feeds the third antenna using the first feeding point, and simultaneously generates a coupling capacitance in the first slot 12 in order to feed the first antenna and the second antenna.

Figure 9:
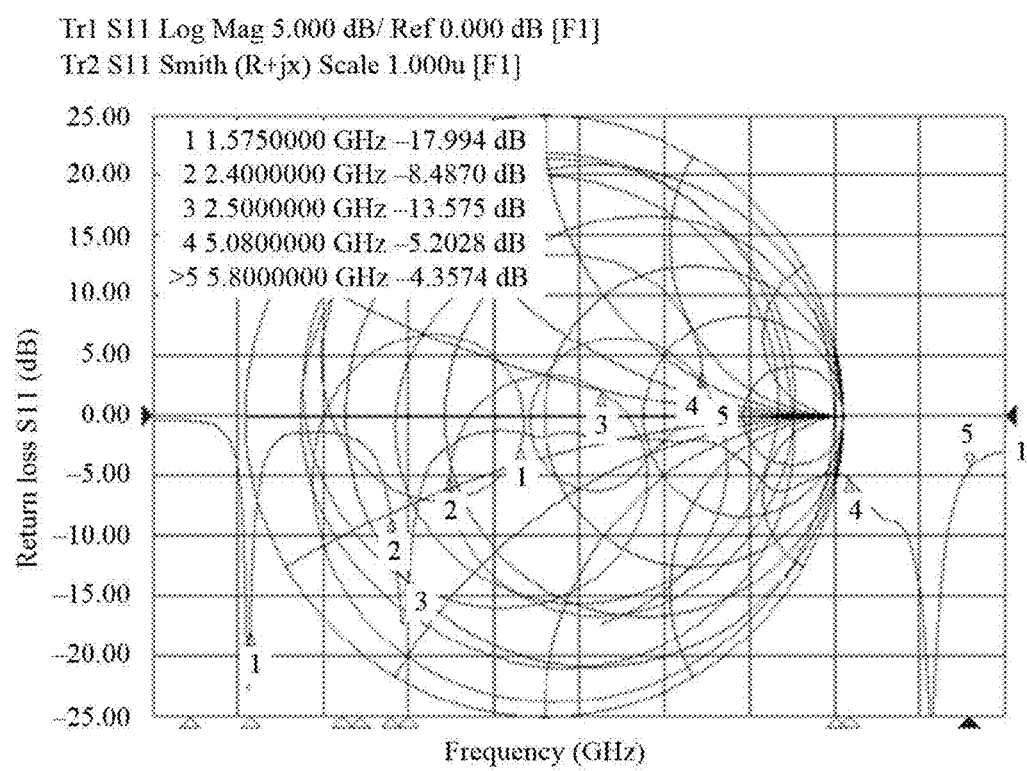
FIG. 9 is a schematic diagram of return losses actually measured when an antenna system in a mobile communications terminal operates according to an embodiment of the present disclosure.
Figure 10:
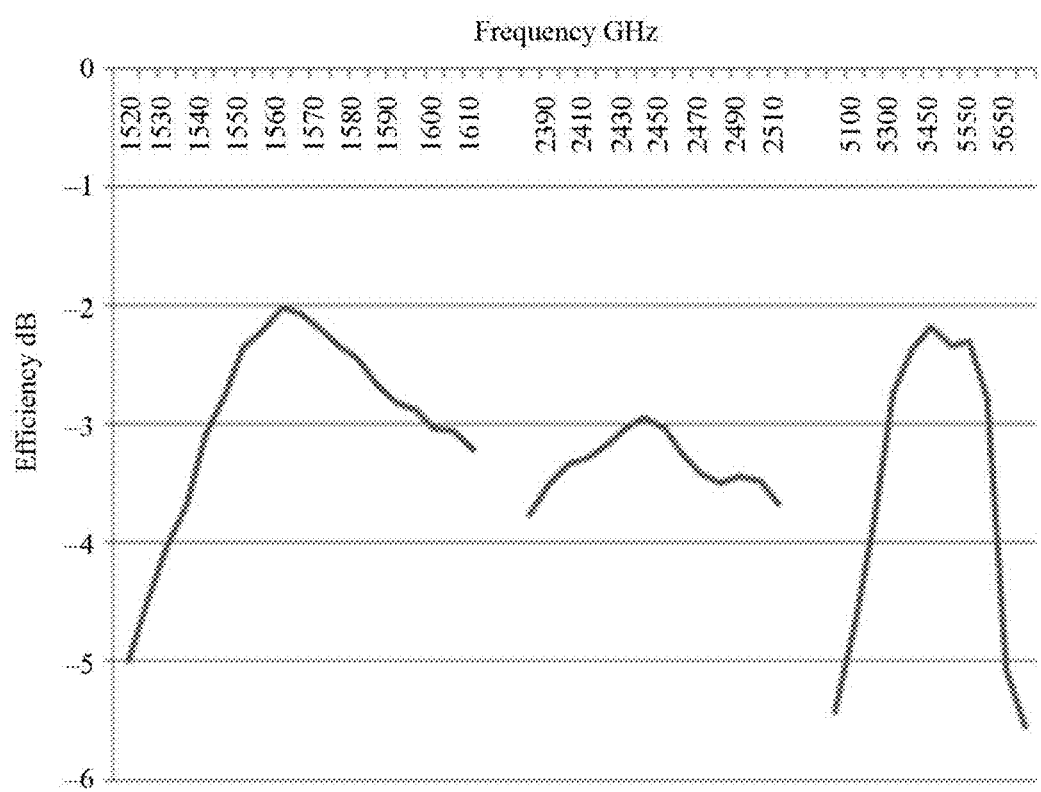
FIG. 10 is a schematic diagram of efficiency of the antenna system that is of the mobile communications terminal and that is corresponding to FIG. 9.

When the first feeding structure 13 feeds the first antenna, the second antenna, and the third antenna in the foregoing manner, specific return losses actually measured when the antenna system in the mobile communications terminal operates are shown in FIG. 9, and actually measured efficiency of the antenna system is shown in FIG. 10.

In another optional manner, the first feeding structure 13 may directly feed the first antenna, the second antenna, and the third antenna.

Figure 11:
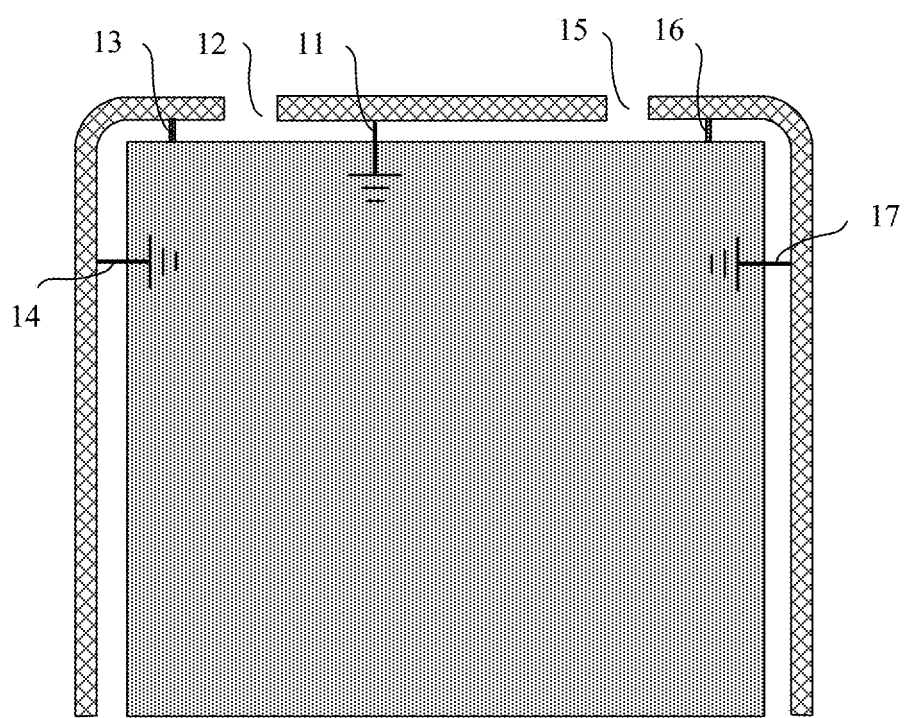
FIG. 11 is a schematic structural diagram of an antenna system in a mobile communications terminal when the antenna system is a diversity antenna structure or a combination antenna structure according to another embodiment of the present disclosure.

It may be understood that the antenna system in the mobile communications terminal is not limited to the foregoing structure. As shown in FIG. 11, in the mobile communications terminal, a second feeding structure 16 and a third ground point 17 are further disposed between the circuit board 2 and the metal frame 1, and the metal frame 1 is provided with a second slot 15 in order to form a diversity antenna structure.

Further, the second feeding structure 16 may include a second feeding point.

More further, when the second feeding structure 16 may include the second feeding point, the second slot 15, the second feeding point, and the third ground point 17 may be arranged in the following manners.

Manner 1 In an extension direction of a gap between the circuit board 2 and the metal frame 1, the second slot 15 is located on a side that is of the first ground point 11 and that is opposite to the first slot 12, the second feeding point is located on a side that is of the second slot 15 and that is opposite to the first ground point 11, and the third ground point 17 is located on a side that is of the second feeding point and that is opposite to the second slot 15.

Manner 2 In an extension direction of a gap between the circuit board 2 and the metal frame 1, the second feeding point is located on a side that is of the second ground point 14 and that is opposite to the first feeding point 13, the second slot 15 is located on a side that is of the second feeding point and that is opposite to the second ground point 14, and the third ground point 17 is located on a side that is of the second slot 15 and that is opposite to the second feeding point.

In the diversity antenna structure formed in the mobile communications terminal, two parts of the formed diversity antenna structure may share the first ground point 11 such that space occupied by the antenna system can be reduced.

Persons skilled in the art can make various modifications and variations to embodiments of the present disclosure without departing from the spirit and scope of the present disclosure. The present disclosure is intended to cover these modifications and variations provided that they fall within the protection scope defined by the following claims and their equivalent technologies.

What is claimed is:

1. A mobile communications terminal, comprising:
   a metal backplane;
   a metal frame disposed around and perpendicular to the metal backplane and provided with a first slot, a first ground point, and a second ground point;
   a circuit board disposed in a section surrounded by the metal frame and parallel to the metal backplane;
   a gap formed between the metal frame and the metal backplane in a thickness direction of the metal backplane;
   a first feeding structure formed between the circuit board and the metal frame and located between the first ground point and the second ground point,
   the first slot being located between the first ground point and the first feeding structure to form a first antenna comprising a first resonance frequency, a second antenna comprising a second resonance frequency, and a third antenna comprising a third resonance frequency,
   the first antenna being configured to set a part of the metal frame between the first slot and the first ground point as a radiator,
   the second antenna being located between the first slot and the first ground point and being configured to set a gap between the metal backplane and the part of the metal frame between the first slot and the first ground point as a radiation slot,
   the third antenna being located between the first slot and the second ground point and configured to set a gap between the metal backplane and a part of the metal frame between the first slot and the second ground point as another radiation slot, and
   the first resonance frequency, the second resonance frequency, and the third resonance frequency being different.

2. The mobile communications terminal of claim 1, wherein when the first antenna operates at the first resonance frequency, an electric field and currents evenly distributed in the circuit board and the metal frame, a length of the second antenna comprising a quarter wavelength corresponding to the second resonance frequency, and a length of the third antenna comprising a half wavelength corresponding to the third resonance frequency.

3. The mobile communications terminal of claim 1, wherein the first feeding structure comprises a first feeding point disposed between the first slot and the second ground point.

4. The mobile communications terminal of claim 1, wherein a second feeding structure and a third ground point disposed between the circuit board and the metal frame, and the metal frame being provided with a second slot to form a diversity antenna structure.

5. The mobile communications terminal of claim 4, wherein the second feeding structure comprises a second feeding point.

6. The mobile communications terminal of claim 5, wherein in an extension direction of a gap between the circuit board and the metal frame, the second slot is located on a side of the first ground point opposite to the first slot, the second feeding point is located on a side of the second slot opposite to the first ground point, and the third ground point is located on a side of the second feeding point opposite to the second slot.

7. The mobile communications terminal of claim 5, wherein in an extension direction of a gap between the circuit board and the metal frame, the second feeding point is located on a side of the second ground point opposite to a first feeding point, the second slot is located on a side of the second feeding point opposite to the second ground point, and the third ground point is located on a side of the second slot opposite to the second feeding point.

8. The mobile communications terminal of claim 1, further comprising a metal housing, and the metal backplane comprising a portion of the metal housing.

9. The mobile communications terminal of claim 1, wherein the first slot is disposed on a top of the mobile communications terminal.

10. The mobile communications terminal of claim 1, wherein the first antenna comprises a global positioning system (GPS) antenna.

11. The mobile communications terminal of claim 1, wherein the first feeding structure feed the first antenna, the second antenna, and the third antenna.

12. The mobile communications terminal of claim 1, wherein the first slot is disposed on a side of the mobile communications terminal.

* * * * *